3,355,515
SECONDARY AROMATIC AMINES AS STORAGE STABILIZERS FOR UNSATURATED POLYESTERS CONTAINING HYDROPEROXIDES

Hans Rudolph and Karl Raichle, Krefeld-Bockum, Germany, assignors to Farbenfabriken Bayer Aktiengesellschaft, Leverkusen, Germany, a corporation of Germany
No Drawing. Filed Feb. 23, 1966, Ser. No. 529,252
Claims priority, application Germany, Apr. 21, 1965,
F 45,867
6 Claims. (Cl. 260—864)

This application is a continuation in part of our copending application, Ser. No. 455,309, filed May 12, 1965, and now abandoned, concerning storage-stable, hardenable masses based on unsaturated polyesters with a content of ketone hydroperoxides.

Moulding masses based on unsaturated polyester with a content of organic peroxides are hardened either by heating or by the addition of accelerators. Before working up, the peroxide-containing moulding masses should be capable of being stored for as long as possible at room temperature or at a moderately elevated temperature, without gelling prematurely.

Since the usual peroxide-containing moulding masses do not satisfy these requirements of storage life, it has already been suggested to add to them fairly large amounts of inhibitors, such as hydroquinone or di-tert.-butyl-quinone. An improved storage stability can also be achieved by the use of suitable peroxide mixtures, e.g. of cyclohexanone peroxide and tert.-butyl-hydroperoxide. However, for the hardening of the moulding masses, especially in the cold, these methods are unsatisfactory since they lead to a loss of reactivity which frequently manifests itself not only in a delayed hardening but also in incompletely hardened end products.

In the production of coatings from unsaturated polyester masses—especially according to the double-diehead casting process in which a long-lasting stability of the peroxide-containing materials is also desired—a way out has been found by using solutions of the unsaturated polyesters in non-copolymerizable solvents as peroxide-containing components. The final user is thus supplied with the solutions already containing peroxide and is consequently relieved from working with the dangerous undiluted peroxides, especially from their troublesome introduction into the solution. Such a procedure, however, also makes demands upon the storage life of the peroxide-containing polyester solutions which these are generally unable to meet.

It has now been found that hardenable masses based on unsaturated polyesters with a content of co-polymerizable monomeric, unsaturated compounds and/or non-polymerizable solvents, hydroperoxides and, according to the invention, secondary aromatic amines of the general formula:

wherein Ar signifies a possibly substituted aromatic radical, and R signifies an aliphatic, cycloaliphatic or aromatic radical, possibly with a content of other amines and/or phosphines and/or arsines and/or stibines, are outstandingly storable at room temperature or at a slightly elevated temperature. This is surprising since the amines to be added according to the invention have an accelerating effect in combination with acyl peroxides as well as with hardening systems which contain hydroperoxides and cobalt activators.

Secondary aromatic amines which are added to hydroperoxide-containing polyester masses according to the invention in order to improve the storage life are, for example: N-monomethyl-aniline, N-monoethyl-aniline, N-monopropyl-aniline, N-p-hydroxyethyl-aniline, N-methyl-toluidine, diphenylamine, etc. The amounts of these amines necessary for the stabilization may vary within wide limits, depending upon the nature of the materials to be stabilized. In individual cases, they are easy to determine by simple experiments and lie, in general, between about 0.001 and about 0.5% by weight, referred to the hardenable materials. By the concurrent use of other amines and/or phosphines and/or arsines and/or stibines in amounts of about 0.01—about 1% by weight, the stabilizing action of the secondary aromatic amines can, in some cases, be considerably increased.

Examples of the last-mentioned compounds are:

propylamines,
butylamines,
dodecylamines,
dibutylamine,
triethylamine,
N,N-dimethyl-aniline,
N,N-diethyl-aniline,
N,N-dimethyl-p-toluidine,
diphenyl phosphine,
triphenyl phosphine,
dibenzyl phosphine,
dioctyl phosphine,
diethyl naphthyl phosphine,
phenyl dimethyl phosphine,
tributyl phosphine,
trishydroxyethyl phosphine,
tris-p-dimethyl-aminophenyl phosphine,
methyl-bis-diphenyl phosphine,
tricyclopentyl phosphine,
triphenyl arsine,
tribenzyl arsine,
trioctyl arsine,
triphenyl stibine,
tridiphenyl stibine,
trinaphthyl stibine,
tritolyl stibine, etc.

The synergistic effect which results with the combined use of these compounds and of the secondary aromatic amines, is especially surprising since the mentioned other amines or phosphines, arsines or stibines generally shorten the storage life of masses containing the hydroperoxides.

The concurrent use according to the invention of phosphines, arsines and/or stibines is especially advantageous because, with the same storage stability, smaller amounts of secondary aromatic amines are needed so that the discolorations of the hardened products, which otherwise frequently occur when adding large amounts of amines, are substantially avoided.

Unsaturated polyesters in the meaning of the invention are, as usual, polycondensation products from α,β-ethylenically unsaturated dicarboxylic acids, such as maleic acid, fumaric acid, itaconic acid, mesaconic acid and citraconic acid, with poly-alcohols, such as ethylene glycol, diethylene glycol, propane-, butane- and hexane-diols, trimethylolpropane and pentaerythritol, which may also contain radicals of saturated carboxylic acids, e.g. succinic, glutaric acid, adipic acid, phthalic acid, tetrachlorophthalic acid, furthermore of monofunctional alcohols, such as butanol, tetrahydrofurfuryl alcohol and ethylene glycol monobutyl ether, as well as of monobasic acids, such as benzoic acid, oleic acid, linseed oil fatty acid and dehydrated castor oil fatty acid.

Suitable monomeric unsaturated compounds which can be co-polymerized with the unsaturated polyesters are, for example, vinyl compounds, such as styrene, vinyltoluene, and divinyl-benzene, furthermore, vinyl esters, such as vinyl acetate, and also unsaturated carboxylic acids and their derivatives, such as (meth)acrylic acid, ester and nitrile, furthermore allyl esters, such as allyl acetate, allyl acrylate, phthalic acid diallyl ester, triallyl phosphate and triallyl cyanurate.

Mixtures of unsaturated polyesters with monomeric unsaturated compounds may also to be mentioned which, apart from the radicals of $\alpha,\beta$-unsaturated dicarboxylic acids as components of the polyesters, also contain $\beta,\gamma$-unsaturated ether radicals, either also as component of the polyesters, for example, according to British Patent No. 810,222, or as component of other mixture components, for example, according to British Patents Nos. 848,400 and 887,957, which are air-drying, besides being copolymerizable.

Examples of non-polymerizable solvents in which the unsaturated polyesters may be dissolved are: ethyl acetate, butyl acetate, acetone, methylene chloride and toluene.

In addition, the unsaturated polyesters may also contain, in the usual amounts, the customary inhibitors, e.g. p-benzoquinone, 2,5-di-tert.-butyl-p-benzoquinone, hydroquinone, tert.-butyl-pyrocatechol, 3-methyl-pyrocatechol and 4-ethyl-pyrocatechol.

Hydroperoxides to be used according to the invention are, e.g., the various ketone hydroperoxides, such as methyl ethyl ketone hydroperoxide, methyl propyl ketone hydroperoxide, methyl isobutyl ketone hydroperoxide, diethyl ketone hydroperoxide, cyclohexanone hydroperoxide and the like, furthermore alkyl-, cycloalkyl- and aralkyl hydroperoxides, such as cumene hydroperoxide, tert.-butyl hydroperoxide, 1,2,3,4-tetrahydronaphthalene hydroperoxide, cyclohexyl hydroperoxide and diisopropylbenzene monohydroperoxide and the like.

The following examples are given for the purpose of illustrating the present invention:

EXAMPLE 1

A polyester of acid number 47, produced by the condensation of 152 parts by weight of maleic anhydride, 141 parts by weight of phthalic anhydride and 195 parts by weight of propane-1,2-diol, is mixed with 0.045 part by weight of hydroquinone and dissolved to give a 65% solution in styrene to form a polyester moulding mass.

50 g. amounts of this moulding mass are mixed with the amounts of secondary aromatic amines given in Table I and with 10 g. amounts styrene as well as 2.8 g. amounts cyclohexanone hydroperoxide paste (50% in dibutyl phthalate).

The mixtures obtained, as well as a test sample of the same constitution but not containing any amine, are warmed to 30° C. in a thermostat. Table I indicates the considerably improved storage stability of the moulding masses according to the invention.

TABLE I

| Additions to the polyester moulding masses: | Storage stability at 30° C., hrs. |
|---|---|
|  | 3 |
| 0.06% by weight of ethyl-aniline | 6 |
| 0.06% by weight of diphenylamine | 7 |

EXAMPLE 2

Samples of the polyester moulding mass according to Example 1 are mixed, in the manner stated in Example 1, with the amounts of secondary aromatic amines given in Table II, and some additionally with other amines, phosphines, arsines or stibines in stated amounts, as well as with methyl ethyl ketone hydroperoxides (40% in dimethyl phthalate), instead of cyclohexanone hydroperoxide paste, in the same amount.

Table II indicates the storage stability of these moulding masses at 25 and 30° C. and, for comparison, of addition-free moulding masses.

The reactivities also given in the table were determined either by heating the polyester moulding masses to 80° C., between glass plates or by the addition of 0.016 percent by weight of cobalt, in the form of cobalt naphthenate, at 20° C. in a thermostat.

Table II also shows that by the addition of other than secondary aromatic amines, phosphines or arsines, the storage stability is practically not improved but, on the contrary, almost always reduced.

TABLE II

| Additions to the polyester moulding mass | Storage stability, hours | | Reactivity, min. (measured as gel time) | |
|---|---|---|---|---|
| | at 25° C. | at 30° C. | | |
| | 5 | 2.5 | ¹ 7 | ² 6 |
| +0.006% ethyl aniline | 10 | 5 | | |
| +0.17% triphenylphosphine | | | | |
| +0.01% ethyl aniline | 18 | 7 | ¹ 5 | |
| +0.2% triphenylphosphine | | | | |
| +0.01% ethyl aniline | 18 | 7 | ¹ 6 | ² 6 |
| +0.25% triphenylarsine | | | | |
| +0.01% ethyl aniline | 15 | 5 | | |
| +0.3% triphenylstibine | | | | |
| +0.01% ethyl aniline | 18 | 7 | | |
| +0.05% dimethylaniline | | | | |
| +0.01% ethyl aniline | 18 | 7 | | |
| +0.2% tri-butylphosphine | | | | |
| +0.01% ethyl aniline | 18 | 7 | | |
| +0.1% di-n-butylamine | | | | |
| +0.05% diphenylamine | 16 | 7 | | |
| +0.01% diphenylamine | 18 | 7 | ² 6 | |
| +0.2% triphenylphosphine | | | | |
| +0.2% triphenylphosphine | 4 | 1.75 | | |
| +0.25% triphenylarsine | 5 | 2.5 | | |
| +0.05% dimethylamine | 5.5 | 3 | | |
| +0.20% tributylphosphine | 4 | 1.75 | | |
| +0.1% di-n-butylamine | 4 | 1.75 | | |

¹ Cold hardened with Co-accelerator (thermostat 20° C.).
² Hardened by heating at 80° C. between glass plates.

EXAMPLE 3

An unsaturated polyester with the acid number 23, produced by the condensation of 882 parts by weight of maleic anhydride, 1332 parts by weight of phthalic anhydride, 1098 parts by weight of ethylene glycol and 963 parts by weight of trimethylol-propane diallyl ether in the presence of 0.43 part by weight of hydroquinone, is dissolved in styrene to give a 65% solution, to form a moulding mass and, as stated in Example 1, tested for storage stability with the addition of N-$\beta$-hydroethyl-aniline and triphenyl phosphine and with the use of methyl ethyl ketone hydroperoxide. Table III indicates the considerably improved storage stability of the moulding masses according to the invention.

TABLE III

| Addition to the polyester moulding mass | Storage stability, hours | |
|---|---|---|
| | at 25° C. | at 30° C. |
| | 8 | 5 |
| +0.01% N-$\beta$-hydroxyethlyaniline | 24 | 15 |
| +0.2% triphenyl phosphine | | |

EXAMPLE 4

The unsaturated polyester described in Example 1 is dissolved in butyl acetate to give an 80% solution. If, according to the invention, this solution is mixed with 0.01 percent by weight of ethyl-aniline, 0.2 percent by weight of triphenyl phosphine and 10 percent by weight of methyl ethyl ketone hydroperoxide (40% in dimethylphthalate), then the storage stability of the polyester solution obtained amounts to more than 5 days at 40° C., whereas the storage stability without the addition of ethyl-aniline and triphenyl phosphine amounts to only 3 days.

EXAMPLE 5

A polyester prepared by condensation of 152 parts by weight of maleic acid anhydride, 141 parts by weight phthalic acid anhydride and 195 parts by weight propane-diol-1,2 and having the acid number 47 is mixed with 0.045 part by weight hydroquinone and dissolved in styrene at a concentration of 65% to produce a hardenable mass. Portions of 50 g. of this mass are mixed with the peroxides stated in the table, additives according to the invention and in each case with 10 g. styrene. The storability test is carried out at 30° C. in a thermostat.

The reactivity values also given in the table were determined either by heating the masses concerned at 80° C. between glass plates or by the addition of 0.016 percent by weight cobalt in the form of cobalt naphthenate at 20% C. in a thermostat.

| Peroxide additive | Additive to the hardenable mass according to the invention | Storability at 30° C. (days) | Reactivity (measured in gel time) |
|---|---|---|---|
| 4% cumene hydroperoxide (70%) | | 1 | 7 hrs.[1] 15 min.[2] |
| 4% tert. butyl hydroperoxide (75%) | | 1 | 20 min.[2] |
| 4% tert. butyl hydroperoxide (75%) | 0.03% ethyl aniline | 5 | 20 min.[2] |
| 4% cumene hydroperoxide (70%) | ----do---- | 5 | 6 hrs.[1] 15 min.[2] |
| 4% cumene hydroperoxide (70%) | 0.006% ethyl aniline+0.17% triphenyl phosphine. | 3 | |
| 4% cumene hydroperoxide (70%) | 0.01% ethyl aniline+0.1% di-n-butylamine. | 4 | |

[1] Hardened cold with Co-accelerator (thermostat 20° C.).
[2] Hardened by heating at 80° C. between glass plates.

EXAMPLE 6

An unsaturated polyester prepared by condensation of 882 parts by weight maleic acid anhydride, 1332 parts by weight phthalic acid anhydride, 1098 parts by weight ethylene glycol and 963 parts by weight trimethylol propane-diallyl ether in the presence of 0.43 part by weight hydroquinone and having the acid number 23 is dissolved in styrene at a concentration of 65% to produce a moulding mass or coating mass. Samples of this mass are mixed with additives according to the invention as stated in the table below. After a further addition of 4% of a 70% cumene hydroperoxide solution, the stability is measured in a thermostat at 30° C.

| Additive to the polyester moulding mass | Storability at 30° C. (days) | Reactivity, min. (measured as gel time) |
|---|---|---|
| 0.03% N-ethyl aniline | 1.5 | 25 |
| | 3.5 | 20 |
| 0.01% N-β-hydroxyethyl aniline+ 0.2% triphenyl phosphine | 3 | 20 |

The reactivity values also given in the table were determined after a further addition of 0.016 percent by weight cobalt in the form of cobalt naphthenate at 80° C. in a thermostat.

What we claim is:
1. A storage-stable, hardenable mass consisting essentially of a mixture of (a) an unsaturated polyester which is the condensation product of an α,β-ethylenically unsaturated dicarboxylic acid and a polyalcohol, (b) at least one compound selected from the group consisting of copolymerizable, monomeric unsaturated compounds and a non-copolymerizable solvent for said unsaturated polyester, (c) a catalytic amount of a hydroperoxide polymerization catalyst and (d) a storage-stabilizing amount of a secondary aromatic amine of the formula:

R—NH—Ar wherein Ar is aryl and R is selected from the group consisting of alkyl, cycloalkyl and aryl.

2. The storage-stable, hardenable mass of claim 1 wherein said secondary aromatic amine is present in an amount from about 0.001 to about 0.5% by weight, based on the weight of said mixture.

3. The storage-stable, hardenable mass of claim 1 including a costabilizing amount of a compound selected from the group consisting of amines other than said secondary aromatic amines of said formula, phosphines, arsines and stibines.

4. The storage-stable, hardenable mass of claim 3 wherein said secondary aromatic amine of said formula is present in an amount of from about 0.001 to about 0.5% by weight and said costabilizer is present in an amount of about 0.01 to about 1% by weight, said percentages being based on the total weight of said mixture.

5. The storage-stable, hardenable mass of claim 1 wherein the hydroperoxide is selected from the group consisting of methyl ethyl ketone hydroperoxide, methyl propyl ketone hydroperoxide, methyl isobutyl ketone hydroperoxide, diethyl ketone hydroperoxide, cyclohexanone hydroperoxide, cumene hydroperoxide, tert.-butyl hydroperoxide, 1,2,3,4-tetrahydronaphthalene hydroperoxide, cyclohexyl hydroperoxide and di-isopropyl benbenzene monohydroperoxide.

6. The storage-stable, hardenable mass of claim 3 wherein the hydroperoxide is selected from the group consisting of methyl ethyl ketone hydroperoxide, methyl propyl ketone hydroperoxide, methyl isobutyl ketone hydroperoxide, diethyl ketone hydroperoxide, cyclohexanone hydroperoxide, cumene hydroperoxide, tert.-butyl hydroperoxide, 1,2,3,4-tetrahydronaphthalene hydroperoxide, cyclohexyl hydroperoxide and di-isopropyl benzene monohydroperoxide.

References Cited

UNITED STATES PATENTS

| | | | |
|---|---|---|---|
| 3,001,967 | 9/1961 | Willersinn et al. | 260—865 |
| 3,010,933 | 11/1961 | Lyon. | |
| 3,239,581 | 3/1966 | Raichle et al. | 260—864 |
| 3,267,055 | 8/1966 | Amidon | 260—22 |

FOREIGN PATENTS

| | | |
|---|---|---|
| 467,389 | 8/1950 | Canada. |
| 1,331,003 | 3/1963 | France. |

SAMUEL H. BLECH, *Primary Examiner.*

GEORGE F. LEMES, *Examiner.*

J. T. GOOLKASIAN, *Assistant Examiner.*